(12) United States Patent
LaRochelle

(10) Patent No.: US 6,467,662 B1
(45) Date of Patent: Oct. 22, 2002

(54) FIXED LOADING ROLLER ATTACHABLE TO A VEHICLE RACK

(76) Inventor: Fernand LaRochelle, 254 Park Rd., Westbrook, ME (US) 04092

( * ) Notice: Subject to any disclaimer, the term of this patent is extended or adjusted under 35 U.S.C. 154(b) by 0 days.

(21) Appl. No.: 10/082,586

(22) Filed: Feb. 25, 2002

(51) Int. Cl.[7] .............................................. B60R 9/042
(52) U.S. Cl. ........................ 224/310; 224/322; 414/462
(58) Field of Search ................................ 224/310, 309, 224/322, 323, 405; 414/462

(56) References Cited

U.S. PATENT DOCUMENTS

| | | | |
|---|---|---|---|
| 3,642,157 A | * 2/1972 | Williams, Jr. | 414/462 |
| 4,291,823 A | * 9/1981 | Freeman et al. | 224/310 |
| 4,717,165 A | * 1/1988 | Johnson | 280/414.1 |
| 4,728,244 A | * 3/1988 | Stokkendal | 224/319 |
| 5,511,928 A | * 4/1996 | Ellis | 114/344 |
| 5,904,463 A | * 5/1999 | Christensen | 224/310 |
| D411,163 S | 6/1999 | Bunter | |
| 6,216,928 B1 | * 4/2001 | Blankenburg e tal. | 224/321 |
| 6,315,181 B1 | * 11/2001 | Bradley et al. | 224/310 |

OTHER PUBLICATIONS

Author unknown—"Cargo Racks" catalog pp. No. 40 & 41 p. 41 shows RR 5 Cargo Rack Roller including two U–bolts for mounting to rear slantdown members.

Tailgater catalog—http://www.tailgater.net p. 18 shows "RRR10001 Rear Rack Roller".

* cited by examiner

*Primary Examiner*—Stephen K. Cronln
*Assistant Examiner*—Maerena W. Brevard
(74) *Attorney, Agent, or Firm*—Charles F. Seyboldt

(57) ABSTRACT

An article loading roller mechanism is disclosed. The loading roller permits one person to load or unload heavy articles such as ladders, pipes, lumber, canoes or kayaks. The roller is arranged in a fixed position so that the top of the roller is slightly below the top of the rear cross bar of the vehicle rack. The roller can be removably attached to a rear cross bar of a vehicle rack system by a clamping mechanism. The roller may be covered in part by a pliable scratch-resistant material. An article is loaded by placing a first end of the article onto the roller. The second end of the article is lifted, maintained at an angle such that the article does not touch the vehicle rack nor the vehicle, and is pushed toward the front cross bar of the vehicle rack. The roller reduces the loading friction and facilitates loading with a minimum of effort and time. When an article is in place on the vehicle rack front and rear cross bars, additional articles can be loaded in the same manner. The rotation of the roller will not affect the earlier-loaded article(s).

7 Claims, 4 Drawing Sheets

FIXED LOADING ROLLER ATTACHABLE TO A VEHICLE RACK

BACKGROUND OF THE PRESENT INVENTION

Summary of the Prior Art

This invention relates to a loading roller, and more particularly to a fixed loading roller attachable to a vehicle rack that constitutes an improved device to facilitate loading an article onto and off a vehicle rack. The fixed loading roller of the present invention is characterized by having the top of the loading roller always located below the top surface of the vehicle rack, and by being easily detachable from the vehicle.

One means of loading a heavy article onto and off from a vehicle rack is to overcome the weight of the article, and the sliding friction between the article and the vehicle rack, by heavy lifting and pushing.

U.S. Pat. No. Design D411,163 to W. Bunter shows an ornamental design that includes the use of a roller to overcome the sliding friction between an article and the vehicle rack.

The ornamental design of Bunter illustrates a loading roller having several positions, each of which is fixed in relation to the top of the vehicle rack. A loading roller device according to the ornamental design of Bunter has several disadvantages that are overcome by the present invention:

a. The adjustable roller illustrated by Bunter must be manually placed from a lower position to either an intermediate or upper position to initiate the loading of an article onto a vehicle rack system. The top of the roller is above the top of the vehicle rack when the roller is in either the intermediate or upper position.

b. After an article is in a generally loaded position, the article has to be lifted to return the roller to the lower position. Otherwise the article will be resting on the roller, and not on the vehicle rack. This could result in impact wear or damage to the roller or its axle(s), or could result in the load rolling off the vehicle while it is being transported.

c. To unload an article that is on the vehicle rack, the article has to be lifted to permit the roller to be placed into either the intermediate or the uppermost position.

d. The usefulness of the Bunter device is limited after loading one article. With the first article resting on the loading roller, the rotation of the roller is resisted by the friction of the first article resting on the roller, thereby increasing the force required to load subsequent articles. Or, if the first article is free to move farther, the rotation of the loading roller that is induced by loading the second article will cause the first article to be rolled off the loading roller.

e. The loading roller of Bunter is free to bounce up and down in the bracket slot (illustrated in FIGS. 2, 3, and 4 of Bunter) as the vehicle travels on a road. This may cause distracting noise for the vehicle driver and place loads on the roller axles that shorten their life.

Fixed rollers for loading of items onto a vehicle rack are shown in various vehicle accessory and loading rack catalogs. In some embodiments, the user must drill or otherwise create holes in the vehicle rack to effect an attachment of the fixed roller. The present invention does not require any holes to be made in the vehicle or the vehicle rack system in order to effect attachment.

Other embodiments of fixed loading rollers attachable to vehicles can be removably clamped to a vehicle loading rack, but the clamping device of the present invention is suitable for use on various rack cross-member sections, e.g., circular or square or rectangular. Further, the clamping device of the present invention will cause the top of the roller to be located below the top of the vehicle rack rear cross bar, even when all of the rack cross-members are in the same plane.

SUMMARY OF THE PRESENT INVENTION

The present invention provides an inexpensive, simple, and durable article loading device that is removably attached to a vehicle or a vehicle rack system. The article loading device facilitates the easy loading and unloading of heavy articles from a vehicle or vehicle rack system by a single person and in minimal time.

The article loading device has a fixed position roller, with an axle or axles, and is attached to a vehicle or vehicle rack system so that the top of the roller is positioned slightly below the top of the rear cross bar of the vehicle rack system.

An article is loaded by placing a first end of the article onto the roller. Then the second end of the article is lifted, and the angle of the article is maintained such that the article does not touch the rack system rear cross bar or the vehicle. The article is pushed forward, rolling easily on the article loading device, toward the front rack bar. When the article is in place on the vehicle rack system, additional articles can be loaded in the same manner.

Accordingly, several advantages of the present invention are:

a. The use of a fixed position roller eliminates the need for manually positioning the roller to load or unload an article, and reduces the time required for loading and unloading an article.

b. The fixed position roller eliminates the requirement to lift the end of a loaded article to return the roller to the lower position after the article has been loaded.

c. The fixed position roller eliminates the need to lift the end of a loaded article to place the roller in position for unloading the article.

d. The fixed position roller of the present invention retains its usefulness even after an article (or articles) have been loaded onto the vehicle rack. Loaded articles do not rest on the loading roller, and therefore do not impart friction as the roller is turned by loading of subsequent articles. Loaded articles are also not apt to be rolled out of position due to contact with a roller that rotates during loading of subsequent articles.

e. A fixed roller will not bounce while the vehicle is travelling, because it is constrained within the clearance of the axle and the hole in the bracket, which is minimal. This reduces shock loading on the parts of the loading device, and eliminates or reduces the noise of a bouncing unconstrained roller.

The loading roller can be attached to the vehicle or to a vehicle rack using a clamp mechanism, or by a system of straps and tensioning devices.

The roller can be covered in part by a pliable, scratch-resistant material in order to avoid scratching of the articles that are being loaded.

The axles can be journal bearing types or anti-friction types, and can be located at the ends of the roller. Optionally, in order to accommodate very heavy loads, rollers can be made shorter and/or brackets can be located at intermediate locations along the width of the vehicle or vehicle rack.

The clamp mechanism adapts to various rack cross-member cross sections, e.g., circular, square or rectangular, and is proportioned so that the top of the loading roller will be below the top(s) of circular, square or rectangular sectioned vehicle rack cross-members.

The present invention relates to a fixed loading roller attachable to a vehicle rack that may be adapted and adjusted to accommodate various vehicle widths and various vehicle rack designs. Specific features of the invention will be apparent from the above and from the following description of the illustrative embodiments when considered with the attached drawings and the appended claims.

In summary, and in accordance with the above discussion, the foregoing objectives are achieved in the following embodiments.

1. A method of manipulating an article onto and off the top of a vehicle rack comprising the steps of:
   a. attaching a roller to the vehicle rack so that the top of the roller is positioned below the top of the vehicle rack;
   b. lifting a first end of the article onto the roller;
   c. lifting a second end of the article and pushing the second end of the article toward the roller.

2. A method of manipulating an article onto and off the top of a vehicle rack as described in paragraph 1, where the roller is removably attached to the vehicle rack.

3. A method of manipulating an article onto and off the top of a vehicle rack as described in paragraph 2, where the roller comprises:
   a cylindrical part having a longitudinal axis, first and second ends and where the cylindrical part has an inside diameter at each end;
   two axles, where each axle has an outside diameter that will press-fit the inside diameter of the ends of the cylindrical part; and
   one of the axles is press-fit to the first end, and the other axle is press-fit to the second end, of the cylindrical part.

4. A method of manipulating an article onto and off the top of a vehicle rack as described in paragraph 2, where the removable attachment comprises:
   two brackets and two retainers in combination, where each bracket and retainer in combination define a space that surrounds part of the vehicle rack;
   where each bracket and retainer in combination is clamped to part of the vehicle rack; and
   where the roller is attached to each bracket so the roller can rotate about its longitudinal axis.

5. A method of manipulating an article onto and off the top of a vehicle rack as described in paragraph 4, where the roller comprises:
   a cylindrical part having a longitudinal axis, first and second ends and where the cylindrical part has an inside diameter at each end;
   two axles, where each axle has an outside diameter that will press-fit the inside diameter of the ends of the cylindrical part; and
   one of the axles is press-fit to the first end, and the other axle is press-fit to the second end, of the cylindrical part.

6. A method of manipulating an article onto and off the top of a vehicle rack as described in paragraph 5, where the roller further comprises:
   a scratch resistant material covering the outside diameter of the cylindrical part.

7. A method of manipulating an article onto and off the top of a vehicle rack as described in paragraph 5, wherein:

each bracket has an inside diameter that is separate from the space defined by the bracket and retainer in combination;

each axle has an outside diameter that will slip fit in the inside diameter of a bracket.

8. A method of manipulating an article onto and off the top of a vehicle rack as described in paragraph 7, where the roller further comprises:
   a scratch resistant material covering the outside diameter of the cylindrical part.

9. A method of manipulating an article onto and off the top of a vehicle rack as described in paragraph 2, where the roller comprises:
   a cylindrical part having a longitudinal axis, first and second ends and where the cylindrical part has an inside diameter at each end;
   two bearings, where each bearing has an outside diameter that will fit the inside diameter of the ends of the cylindrical part and where each bearing has an inside diameter;
   two axles, where each axle has an outside diameter that will fit the inside diameter of the bearings; and
   one bearing and one axle is fit to the first end, and the other bearing and axle is press-fit to the second end, of the cylindrical part.

10. A kit for manipulating an article onto and off the top of a vehicle rack comprising:
    a. a roller;
    b. a bracket that is removably attachable to the vehicle rack and that holds the roller so that the roller is free to rotate on its longitudinal axis;
    c. a set of instructions that describes attaching the bracket and the roller to the vehicle rack so that the top of the roller is positioned below the top of the vehicle rack.

DESCRIPTION OF THE PREFERRED EMBODIMENTS OF THE PRESENT INVENTION

Figure 1:
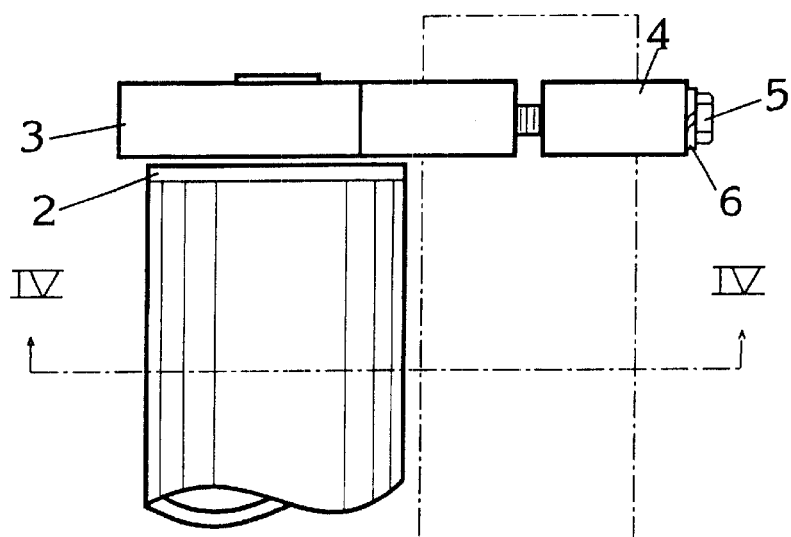
FIG. 1 is a plan view of a fixed loading roller attached to a vehicle rack cross bar having a circular cross-section.
Figure 1:
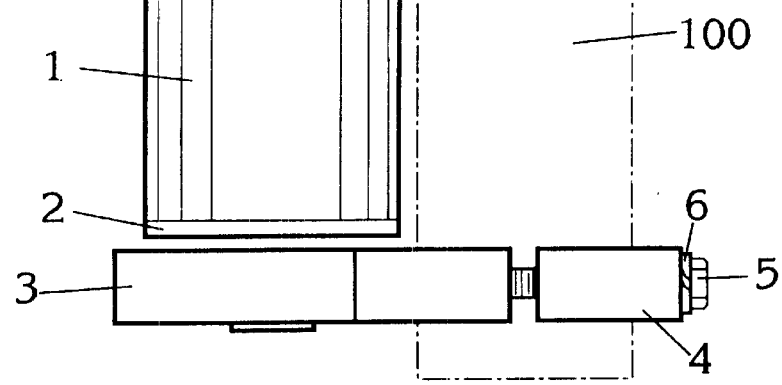

FIG. 1 is a plan view of a fixed loading roller attached to a vehicle rack cross bar having a circular cross-section.

Figure 2:
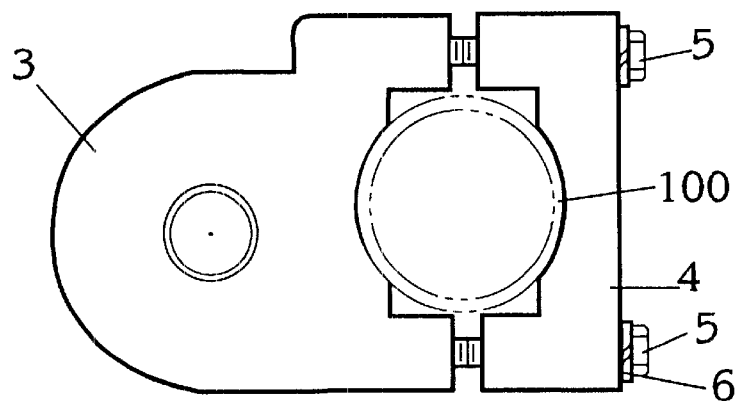
FIG. 2 is a side elevation view of a fixed loading roller attachable to a vehicle loading rack.

FIG. 2 is a side elevation view of a fixed loading roller attachable to a vehicle loading rack.

A roller 1 of an indeterminate length (usually slightly less than the width of the vehicle rack system), is fitted with axles 2 that are rotatable within brackets 3. Brackets 3 are clamped to vehicle rack cross-member 100 using retainers 4, bolts 5, and lock-washers 6.

Roller 1 is preferably a hollow tubular construction, made from a material such as soft steel or aluminum. The proportions of the tubular construction can be varied to suit the anticipated weight of the articles to be loaded.

Roller 1 could be made of a solid material, or of a plastic material, or any suitable material and section considering the length and outside diameter of roller 1, and the density, modulus of elasticity, and tensile strength properties of the material.

Figure 3:
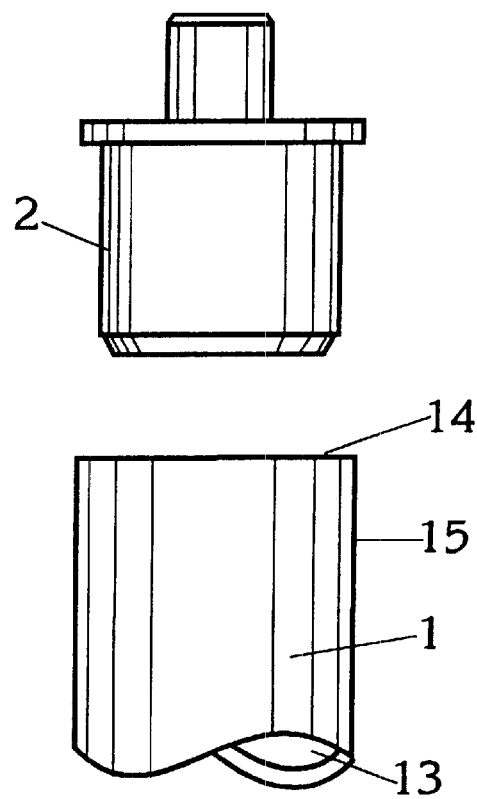
FIG. 3 is an exploded assembly view of a roller and two axles.
Figure 3:
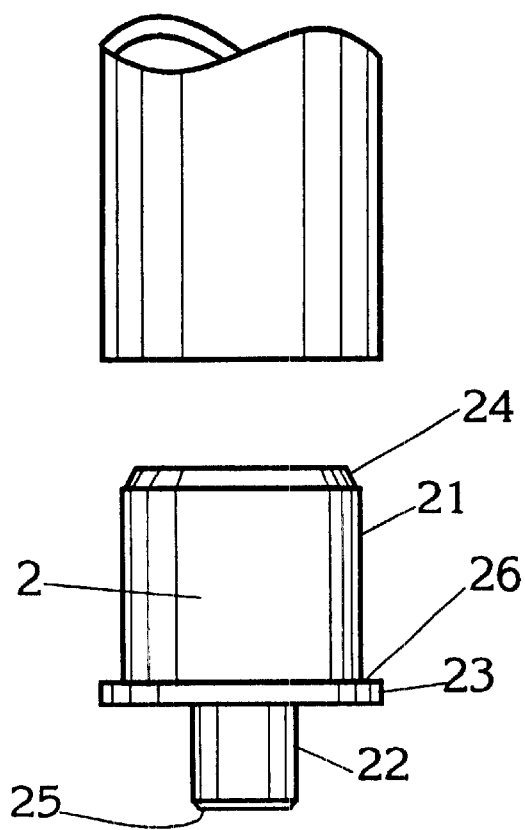

FIG. 3 is an exploded assembly view of a roller and two axles.

The axles 2, are preferably made of a high density plastic material such as high-density poly-vinyl-chloride (PVC) of about 78 Durometer hardness. In the preferred embodiment, axles 2 are proportioned so that outside diameter 21 of axle 2 has a press fit into the inside diameter 13 of roller 1, where the length of the press fit diameter 21 is about 1⅝ inch. Axle 2 has a chamfer 24 to facilitate insertion of diameter 21 to roller inside diameter 13, and shoulder 26 that meets end face 14 of roller 1 when the axle 2 is in its properly assembled position. Shoulder diameter 23 is preferably about the same diameter as the outside diameter 15 of roller 1.

While axles 2 are preferably made separately from the roller 1, they could be formed as an integral part of roller 1. Or, in the alternative, each axle could comprise an anti-friction bearing and a shaft, where the anti-friction bearing is retained in the roller 1 by press fit, shoulders, snap rings, adhesive, or any other bearing retention means; and where the shaft is retained in the anti-friction bearing by press fit, shoulders, snap rings, adhesive, or any other shaft retention means.

Figure 4:
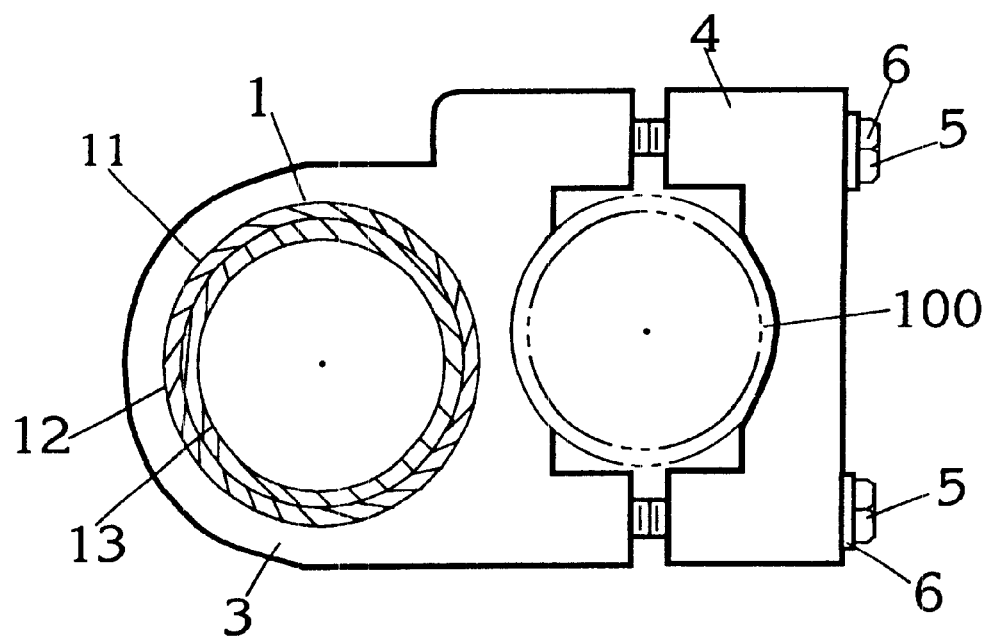
FIG. 4 is a sectional view taken along line IV—IV in FIG. 1.

FIG. 4 is a sectional view taken along line IV—IV in FIG. 1.

In the preferred embodiment, roller 1 comprises a rigid tube 11, covered in part by a pliable scratch-resistant material 12. In the preferred embodiment, the rigid tube material 11 is galvanized steel, having an inside diameter 13 of about 1⅞ inch and a wall thickness of about 0.065 inch, and being from about 46 inches to about 56 inches long; and the pliable material 12 is low density poly-vinyl-chloride (PVC) having a hardness of about 63 Shore Scleroscope. Pliable material 12 has a thickness of about 0.063 inch, and is shrunk onto rigid tube 11.

In alternative embodiments within the scope of the present invention, roller 1 could be a solid cylindrical member having recesses in each end for the fitting of axles or bearings; or roller 1 could be a solid cylindrical member with axles or bearings being fit to the outside diameter of roller 1.

In FIG. 4, the top of roller 1 is shown slightly below the top of the vehicle rack cross member 100. This distance is preferably about ¼ inch, but may be varied for optimum performance.

Figure 5:
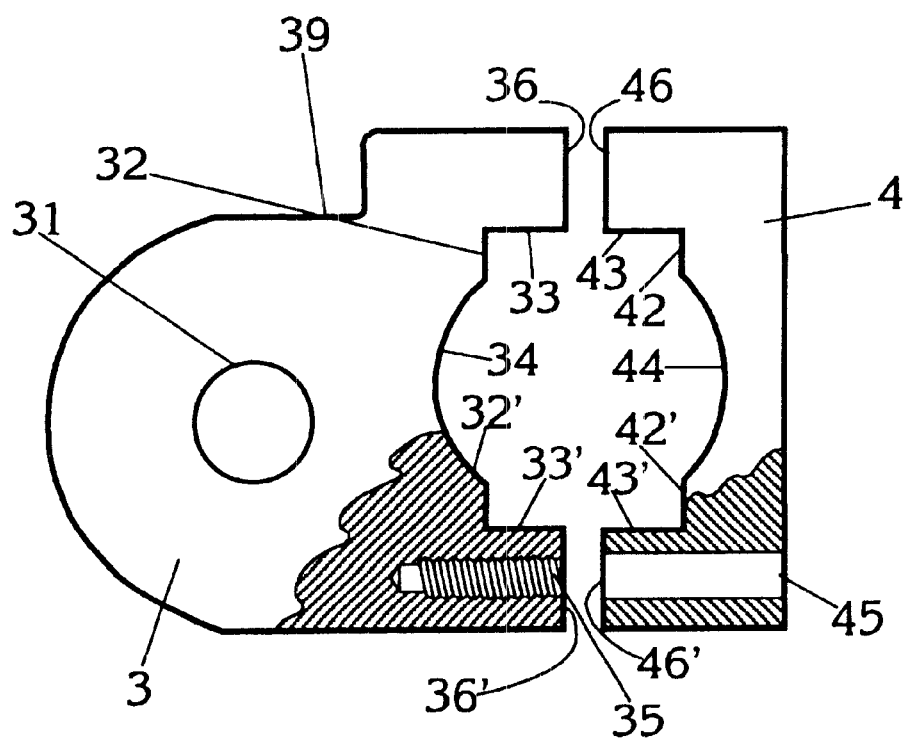
FIG. 5 is a partial-sectional view of a bracket and retainer.

FIG. 5 is a partial-sectional view of a bracket and retainer.

Brackets 3 and retainers 4 are preferably made from an aluminum-magnesium alloy that is cast to near-net shape. But the brackets 3 and retainers 4 could be made from any material and fabrication process that provides suitable strength, dimensional consistency, corrosion resistance, and cost.

In the preferred embodiment, bearing diameter 22 of axle 2 has a rotating clearance fit into retaining hole 31 of bracket 3. A bearing 22 having about ¾ inch diameter and ¾ inch length is preferred. But as described above, various means (e.g., anti-friction bearings) may be used to permit the rotation of roller 1 with respect to brackets 3.

Brackets 3 are clamped to the cross-bar 100 of a vehicle rack system by means of retainers 4, that are drawn toward brackets 3 by a plurality of threaded bolts 5. Bolts 5 pass through clearance holes 45 in retainers 4, and into threaded holes 35 in brackets 3. Threaded holes 35 are preferably about 5/16-18, but can be any appropriate diameter and pitch. Bolts 5 are preferably hex-head machine bolts, but could be any style. For example, clearance holes 45 could be counterbored to accept the heads of socket head cap screws. Lock washers 6 are provided to resist loosening of threaded bolts 5.

Brackets 3 and retainer 4 in combination create a space that adapts to various sections of cross-bar 100.

Surfaces 32–32', 33–33', 42–42' and 43–43' define a rectangular space. In the preferred embodiment, planes 33–43 and 33'–43' are approximately 1½ to 1¾ inch apart, and planes 32–32' and 42–42' are about 1 to 2 inches wide, depending on the distance between bracket 3 and retainer 4. The assembled gap between plane 36–36' and plane 46–46' can be near zero, or as much as several inches, but is typically between 1/16 inch and 1½ inch.

The outside diameter of roller 1, the centerline of retaining hole 31, and the location of the plane defined by surfaces 33–43 are coordinated so that the top of roller 1 will be below the plane defined by surfaces 33–43.

To adapt to circular vehicle rack sections, the preferred bracket 3 and retainer 4 in combination also provide surfaces 34 and 44 that define a cylindrical space having a diameter of about 1⅝ inch.

The simplest arrangement of roller, axles and brackets will use a single roller and two brackets. But the scope of the present invention contemplates the use of multiple rollers and additional brackets, e.g., to handle more massive loads or less rigid rollers.

In a multiple-roller arrangement, each roller can be fitted with two axles or shafts, and intermediate brackets can be dimensioned so that the top of the rollers 1 appear above the top 39 of the intermediate bracket 3. It is also within the scope of the present invention that intermediate brackets 3 be made wide enough that the axles (or shafts) of two adjacent rollers can fit within retaining hole 31 of a single intermediate bracket 3.

The drawings necessarily show specific structural arrangements embodying the invention. However, it will be appreciated that the invention can be practiced in various forms and structural combinations.

The present invention, described above, relates to a fixed loading roller attachable to a vehicle rack. Features of the present invention are recited in the appended claims. The drawings contained herein necessarily depict structural features and embodiments of the fixed loading roller attachable to a vehicle rack, useful in the practice of the present invention.

However, it will be appreciated by those skilled in the arts pertaining thereto, that the present invention can be practiced in various alternate forms, proportions, and configurations. Further, the previous detailed descriptions of the preferred embodiments of the present invention are presented for purposes of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

What I claim is:

1. A method of manipulating an article onto and off the top of a vehicle rack comprising the steps of:
   a. removably attaching a roller to the vehicle rack so that the top of the roller is positioned below the top of the vehicle rack, where the roller comprises:

a cylindrical part having a longitudinal axis, first and second ends and where the cylindrical part has an inside diameter at each end, two axles, where each axle has an outside diameter that will press-fit the inside diameter of the ends of the cylindrical part, and one of the axles is press-fit to the first end, and the other axle is press-fit to the second end of the cylindrical part;

b. lifting a first end of the article onto the roller; and c. lifting a second end of the article and pushing the second end of the article toward the roller.

2. A method of manipulating an article onto and off the top of a vehicle rack comprising the steps of:

a. removably attaching a roller to the vehicle rack so that the top of the roller is positioned below the top of the vehicle rack, where the removable attachment comprises:

two brackets and two retainers in combination, where each bracket and retainer in combination define a space that surrounds part of the vehicle rack, where each bracket and retainer in combination is clamped to part of the vehicle rack, and where the roller is attached to each bracket so the roller can rotate about its longitudinal axis;

b. lifting a first end of the article onto the roller; and c. lifting a second end of the article and pushing the second end of the article toward the roller.

3. A method of manipulating an article onto and off the top of a vehicle rack as described in claim 2, where the roller comprises:

a cylindrical part having a longitudinal axis, first and second ends and where the cylindrical part has an inside diameter at each end;

two axles, where each axle has an outside diameter that will press-fit the inside diameter of the ends of the cylindrical part; and one of the axles is press-fit to the first end, and the other axle is press-fit to the second end, of the cylindrical part.

4. A method of manipulating an article onto and off the top of a vehicle rack as described in claim 3, where the roller further comprises:

a scratch resistant material covering the outside diameter of the cylindrical part.

5. A method of manipulating an article onto and off the top of a vehicle rack as described in claim 3, wherein:

each bracket has an inside diameter that is separate from the space defined by the bracket and retainer in combination;

each axle has an outside diameter that will slip fit in the inside diameter of the bracket.

6. A method of manipulating an article onto and off the top of a vehicle rack as described in claim 5, where the roller further comprises:

a scratch resistant material covering the outside diameter of the cylindrical part.

7. A method of manipulating an article onto and off the top of a vehicle rack comprising the steps of:

a. removably attaching a roller to the vehicle rack so that the top of the roller is positioned below the top of the vehicle rack, where the roller comprises:

a cylindrical part having a longitudinal axis, first and second ends and where the cylindrical part has an inside diameter at each end, two bearings, where each bearing has an outside diameter that will fit the inside diameter of the ends of the cylindrical part and where each bearing has an inside diameter, two axles, where each axle has an outside diameter that will fit the inside diameter of the bearings, and one bearing and one axle is fit to the first end, and the other bearing and axle is fit to the second end of the cylindrical part;

b. lifting a first end of the article onto the roller; and c. lifting a second end of the article and pushing the second end of the article toward the roller.

\* \* \* \* \*